United States Patent [19]

Williamson

[11] 4,197,975
[45] Apr. 15, 1980

[54] POOL BRAZING APPARATUS FOR MANUFACTURING ROTOR CAGES

[75] Inventor: Terence J. Williamson, Denton, England

[73] Assignee: Mather & Platt Limited, Manchester, England

[21] Appl. No.: 922,702

[22] Filed: Jul. 7, 1978

[30] Foreign Application Priority Data

Oct. 14, 1977 [GB] United Kingdom ............... 42741/77

[51] Int. Cl.² .............................................. B23K 1/12
[52] U.S. Cl. ..................................... 228/48; 428/230; 29/598
[58] Field of Search .................... 432/11, 13, 239, 225, 432/230; 228/47, 48; 29/596–598; 164/DIG. 10, 103, 334

[56] References Cited

U.S. PATENT DOCUMENTS

| | | | |
|---|---|---|---|
| 2,603,178 | 7/1952 | Cahenzli et al. | 432/230 X |
| 3,927,770 | 12/1975 | Rekawek | 228/48 X |
| 3,961,416 | 6/1976 | Otto | 29/596 |
| 3,991,927 | 11/1976 | Napor et al. | 228/47 X |
| 4,087,903 | 5/1978 | Stoner | 228/244 X |

Primary Examiner—Francis S. Husar
Assistant Examiner—K. J. Ramsey
Attorney, Agent, or Firm—Sughrue, Rothwell, Mion, Zinn and Macpeak

[57] ABSTRACT

A rig for pool brazing an end member such as an end ring or plate to one end of each of a plurality of bars during the production of a cage rotor for an electric machine comprises a chuck for gripping one end of a shaft of the rotor and support means for retaining the other end thereof whereby it can be retained in a substantially vertical position and means for driving the chuck to rotate the rotor. A substantially horizontal and circular framework is arranged around the chuck and defines a gap whereat a rig operator can stand to feed in brazing fluid between the end member and the end of each bar in turn. To heat evenly the ends of the bars and the end member as the rotor is rotated, a plurality of gas burner means are mounted on and spaced around the horizontal framework.

6 Claims, 4 Drawing Figures

POOL BRAZING APPARATUS FOR MANUFACTURING ROTOR CAGES

The present invention relates to a pool brazing rig for rotors for electric machines and rotors brazed by same. In particular, the invention relates to a rig for brazing cage rotors for use in electric induction motors.

It is a well known problem with cage rotors that the rotor bars are prone to fracture after relatively short periods of rotor use. There are many reasons for rotor failure but, in particular, failure is caused by vibration of the bars during operation of the motor, which vibration fatigues the bars so weakening them, and by internal stresses, which are caused both by the differential thermal expansion of different parts of the rotor cage during use of the motor and by the inherent stresses created in the rotor cage during its production.

The object of the present invention is to obviate or substantially mitigate the aforesaid problems.

According to the present invention there is provided a rig for pool brazing an end ring or plate to one end of each of a plurality of bars during the production of a cage rotor, the rig comprising a chuck for gripping one end of a shaft of the rotor to hold it in a substantially vertical position and means for driving the chuck to rotate the rotor, means for supporting the other end of the shaft of the rotor, and gas burner means arranged around a substantially horizontal and circular framework whereby, in use, the end ring or plate and the ends of the bars to be brazed together are heated evenly as the rotor is rotated, a gap being provided in the framework whereat an operator can feed brazing fluid between the end ring or plate and said one end of each bar in turn as the rotor is rotated.

The present invention will now be described by way of example with reference to the accompanying drawings in which.

Cage rotors for induction motors comprise, as is known, a plurality of copper bars of substantially T-shaped or rectangular cross-section, each of which bars is located in one of a plurality of groozes in a laminated core. The bars are brazed at each end to one of a pair of end plates or rings to form the cage construction of the rotor. The pool brazing rig, as shown in FIG. 1, is especially adapted for use in the production of such cage rotors and particularly for brazing the ends of the rotor bars to the end plates or rings of the rotor.

Figure 1:
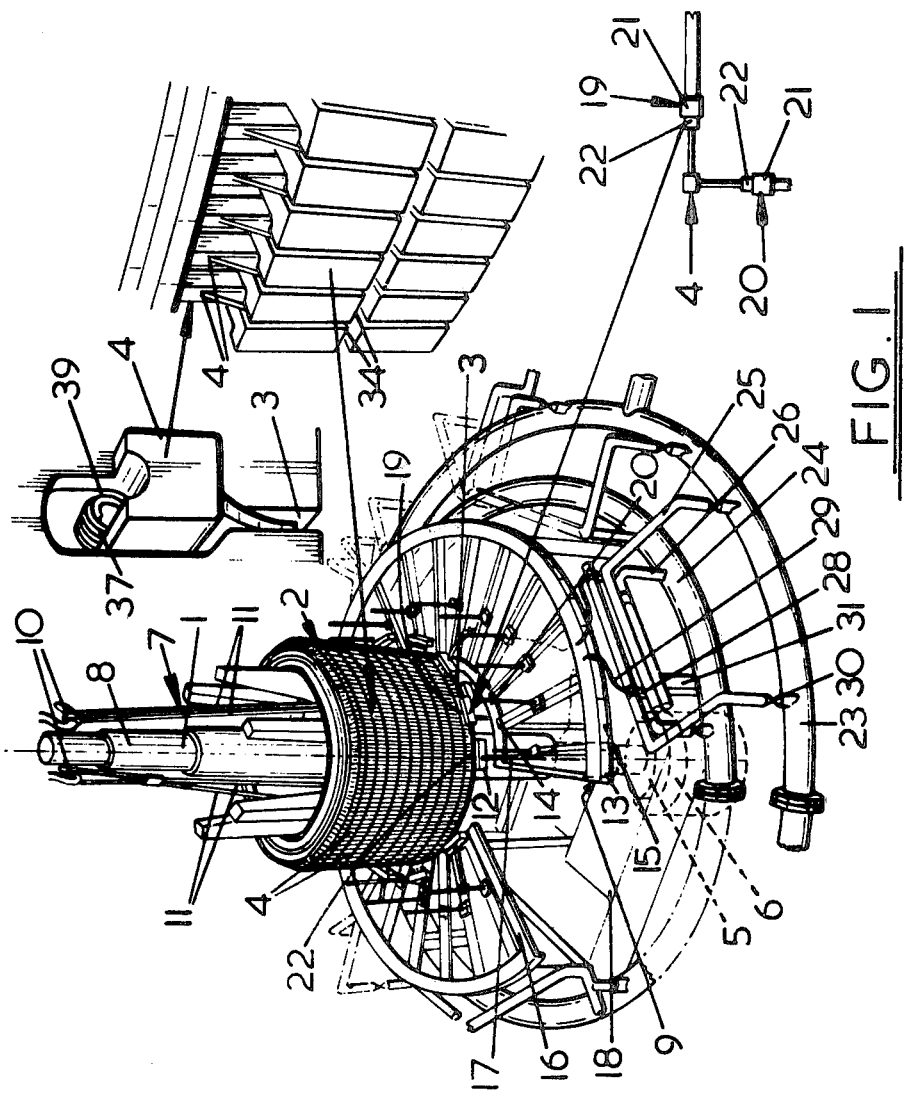
FIG. 1 is a perspective view of a pool brazing rig according to the present invention.

Referring to FIG. 1, the rig comprises means for holding the shaft 1 of a rotor 2 in a substantially vertical position and axially rotating it, and heating means for evenly heating the lowermost rotor end ring 3 and the rotor bars 4 to be brazed together as the rotor 1 rotates.

The holding means comprise a motorised chuck 5 for gripping the lowermost end 6 of the rotor shaft 1 and a suspension means 7 arranged vertically above the chuck 5 to support and steady the uppermost end 8 of the shaft 1. The chuck 5 is located in a well 9 below the level of the rest of the rig and is clutch controlled by means (not shown) to control rotation of the rotor 2 and permit the rotation to be stopped and started as desired by a rig operator. The suspension means 7 comprises three chain hooks 10 which engage four wire cables 11 attached to the rotor 2. The chain hooks 10 may be connected to a crane (not shown) or other lifting or hoisting tackle to facilitate transportation of the rotor 2 to and from the rig and the loading of the rotor 2 in the rig. In a modification, the uppermost end 8 of the shaft 1 may be mounted in a bearing (not shown). The chuck 5 and suspension means 7 are both electronically controllable by the rig operator who thereby has full control of the rig.

The heating means comprise a series of pairs of gas burner points 12 which are mounted on a rigid horizontal, circular sector ring framework 13. The framework 13 comprises inner and outer coaxial frames 14 and 15 respectively between which is connected a plurality of radial bars 16 which are arranged in pairs and form slides. The burner points 12 are each attached to one of a plurality of stands 17 which are slidable along the bars 16 and adjustable in height so that the burner points 12 are both radially and vertically adjustable to accommodate varying sizes of rotor 2. The stands 17 may also be interconnected by mechanical means (not shown) to effect simultaneously sliding thereof along the bars 16 to control the burner position. A gap is provided in the circular frames 14 and 15 where the rig operator can stand on a gridle 18 above the well 9 to feed brazing fluid to the rotating rotor. Owing to the proximity of the operator to the gas burner points 12, it is necessary for him to wear breathing apparatus which may be of any suitable type.

The burner points 12 are arranged alternately around the rotor on the pairs of bars 16 and each pair comprises a burner point 19 which is directed horizontally to heat the ends of the rotor bars 4 and a burner point 20 which is directed vertically upwards to heat the rotor end ring 3. Thus, the burner points 19, 20 of each pair have when lit, flames which are normal to each other.

Each individual burner point 12 comprises a manifold 21 with four separate gas burners 22 which can be fed with a mixture of natural gas and air and which are electronically ignited. The natural gas and air are fed separately to the rig and are supplied to the burner manifolds 21 via two pipework rings 23, 24 which encircle the framework 13 and carry respectively the gas from a mains supply and compressed air at a pressure of approximately 40 to 50 psi.

Each of the pipework rings 23, 24 supplies natural gas and air via pipework stems 25, 26 respectively to a plurality of venturi mixers which each supply gas mixture via a control valve 28 and a length of flexible tubing 29 to one of the manifolds 21. Other control valves 30 and 31 are also provided to control respectively the supply of natural gas and air to the pipework stems 25, 26 from the rings 23, 24.

In a modification of the rig (not shown), the end ring 3 is additionally supported in a correct horizontal attitude relative to the ends of the bars 4 to which it is to be brazed by a support plate. This support plate permits the end ring 3 to rest upon it but is resiliently mounted, for example by spring means, so that compensation is made for the thermal expansion of the end ring 4 during the brazing operation and the correct attitude of the end ring 3 maintained relative to the bars 4.

In use, a rotor 2 is mounted in the rig and heated by the burner points 12 as it is rotated by the motorized chuck 5. The rig operator stands at the position in the framework 13 provided for him and feeds in brazing fluid, in a known manner, between each bar 4 and the end ring 3. As described, the operator controls the rotation of the rotor 2 by the chuck 5, as necessary, after ignition of the burner points 12. After one end ring 3 has been brazed to one end of the bars 4, the rotor 2 can be inverted and the other end ring 3 similarly brazed to the other end of the bars 4.

Figure 2:
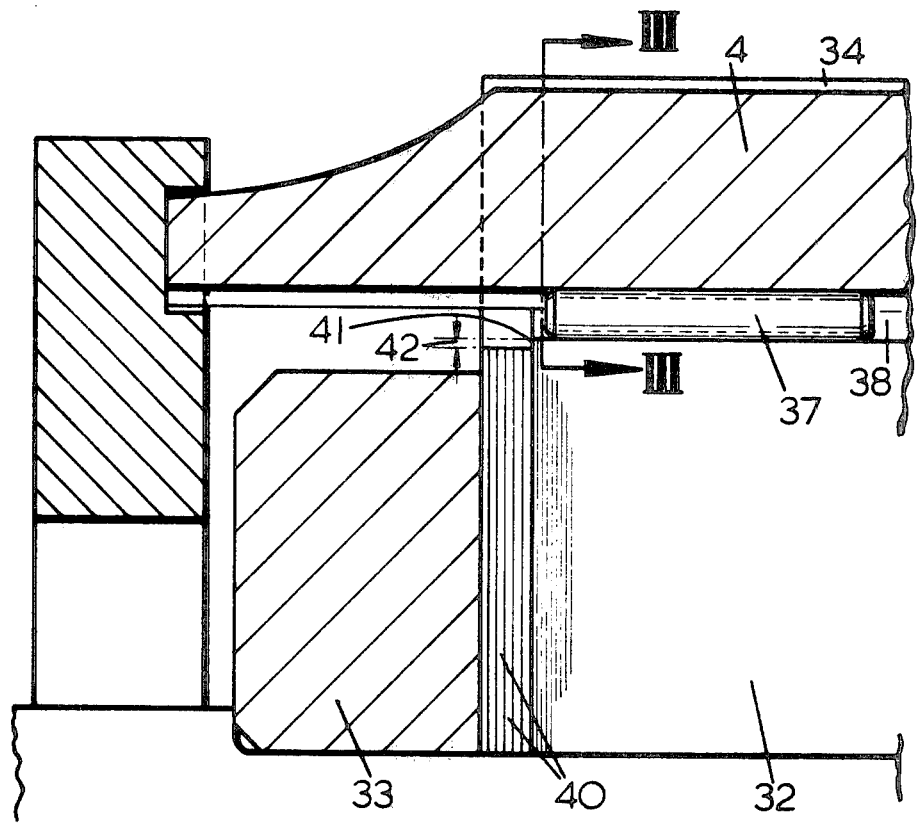
FIG. 2 is a section through part of a rotor for an electric machine which has been pool brazed by a rig as shown in FIG. 1.
Figure 3:
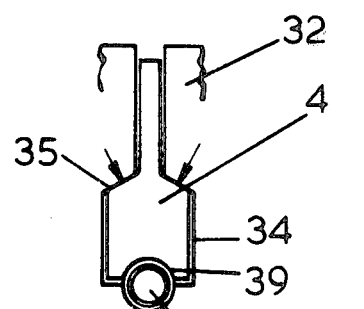
FIG. 3 is a sectional view on the line III—III of FIG. 2.
Figure 4:
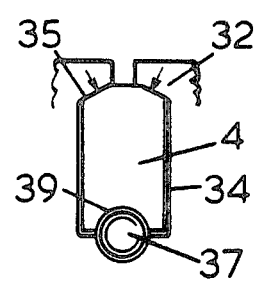
FIG. 4 is a view similar to FIG. 3 showing an alternative construction thereof.

FIG. 2 shows a section through part of a rotor which has had its end ring 3 brazed to the rotor bars 4 by a rig as described above. The rotor comprises a laminated core 32 to which is attached an end plate 33 at each end thereof. The rotor bars 4 are made of copper and are of T-shaped cross-section, as shown in FIG. 3. In an alternative construction, the bars 4 may be of substantially rectangular cross-section as shown in FIG. 4. The bars are each located in one of a plurality of grooves 34 formed in the core 32 and are each provided with sloping shoulders 35 which locate against a complementarily shaped portion of the groove 34 in which the bar 4 lies to provide a solid location of same therein.

Each of the grooves 34 in the core 32 has an inverted T-shaped or rectangular cross-section in conformity with that of the bars 4 and each bar 4 is locked in position by one or more pins 37 of convolute or spiral construction. This locking of the bars 4 in position mitigates bar vibration during use of the rotor and helps to prevent fatigue of the bar 4.

The pins 37 are made of carbon steel and are located in an opening 38 formed between each bar 4 and its respective groove 34, part of the opening 38 being defined by a concave depression 39 formed in the bar 4 during its extrusion. According to the size of the rotor, the number of pins 37 required per bar 4 can be calculated and these are pneumatically driven into the opening 38 and spaced apart with a predetermined spacing. Because the pins 37 are of convolute or spiral construction, they can accommodate variously shaped openings and also permit longitudinal and transverse thermal expansion and contraction of each bar 4 whereby the phenomenon known as "copper shortening" is avoided. Thus, in their underpinned and locked state, the rotor bars 4 are permitted to move so as to resiliently deform the pins 37, which act in a similar fashion to springs, but are so held by the pins 37 as to be unable to vibrate to any significant extent.

The laminated core 32 of the rotor is formed in a conventional manner and, as is customary practice, the end laminates 40 thereof are spot welded together. During the spot welding it is common for one or more of the laminates to be displaced slightly out of position. To prevent any of the rotor bars 4 from abutting the edges of such a displaced laminate and to avoid ratcheting or "stepping up" of the bar 4 as it thermally expands, the slots 38 formed in the core 32 to house the rotor bars 4 are enlarged at their end portions as at 41. A clearance space 42 is thus provided between the core and the end of each of the bars 4 to permit free thermal expansion of the latter when the rotor is in use.

A rotor as described above, which has been pool brazed by a rig as also described, has many advantages over rotors of conventional construction and produced by conventional brazing processes.

The pool brazing of the rotor bars to the end rings 3 of the rotor 2 obviates or substantially mitigates the inherent stress which would otherwise be contained within the rotor 2. During use of the rotor, the temperature will rise and the rotor bars 4 will tend to expand linearly whereas the end rings 3 will tend to expand radially. This produces shearing forces at the brazed connections between the bars 4 and the end of the ring 3. Additionally, there may be inherent stresses already contained within the rotor cage, which stresses were created during the construction of the cage. However, during the pool brazing on the rig, the rotor 2 is evenly heated as it rotates which ensures that the rotor 2 is evenly stressed. Additionally, the temperature of the end rings 3 and the bars 4 is raised to a temperature of approximately 700° C. during the brazing operation which helps to reduce the inherent stresses contained within the rotor 2 and obviates the need to carry out a preheating operation to remove such inherent stress. Hence, the overall stress contained within a rotor which has been pool brazed as described above is reduced below the level than would otherwise have been the case and the rotor is, therefore, able to withstand better the further stresses created therein during operation, thus reducing the likelihood of rotor failure.

The rig also permit the operator to control carefully the temperature changes which takes place in the end rings 3 and the rotor bars 4. This ensures that no adverse changes take place in the mechanical properties of the metals used for making the rotor 2 and permits detrimental metallurgical changes in the rings 3 and the bars 4 to be minimized.

Finally, the brazing rig has the further advantage of permitting the brazing operation on a rotor to be completed in a substantially shorter time than can be achieved using conventional brazing methods.

What is claimed is:

1. A rig for pool brazing an end member to one end of each of a plurality of bars during the production of a cage rotor, the rig comprising: a chuck for gripping one end of a shaft of the rotor, support means to retain the other end of the shaft whereby together with the chuck the rotor can be retained in a substantially vertical position, means for driving the chuck to rotate the rotor, a circular sector ring framework horizontally arranged around the chuck and defining a gap proximate a lower end of the rotor whereat a rig operator can stand, and a plurality of gas burner means mounted on and spaced around the framework whereby, in use, the said one ends of the bars and the end member to be brazed together can be evenly heated as the rotor is rotated and the operator can feed a brazing fluid between the end member and the said one end of each bar in turn.

2. A rig as claimed in claim 1, in which each gas burner means comprises a pair of burner points mounted with radial adjustability on the framework.

3. A rig as claimed in claim 2, in which the pair of burner points comprises a first burner point which is directed substantially horizontally and a second burner point which is directed substantially vertically whereby, when lit, the flames of the first and second burner points are substantially normal to each other.

4. A rig as claimed in claim 3, in which the plurality of gas burner means are arranged whereby the first and second burner points of each pair are mounted alternately around the framework.

5. A rig as claimed in claim 1, in which the chuck is motorised to rotate the rotor, and the support means comprise flexible lines.

6. A rig as claimed in claim 5, in which the flexible lines are attached to a lifting means for loading and unloading the rotor into and out of the rig.

* * * * *